(12) United States Patent
Ohki et al.

(10) Patent No.: US 8,414,059 B2
(45) Date of Patent: Apr. 9, 2013

(54) VEHICLE REAR WINDSHIELD STRUCTURE

(75) Inventors: Yutaka Ohki, Wako (JP); Syotaro Fujikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/291,103

(22) Filed: Nov. 8, 2011

(65) Prior Publication Data

US 2012/0139288 A1    Jun. 7, 2012

(30) Foreign Application Priority Data

Dec. 1, 2010   (JP) .................................. 2010-268540

(51) Int. Cl.
*B60J 1/18*  (2006.01)

(52) U.S. Cl. ......................... 296/96.19; 296/106; 296/76

(58) Field of Classification Search ................... 296/200, 296/201, 84.1, 96.19, 96.21, 146.15, 146.16, 296/56, 106, 76
See application file for complete search history.

(56) References Cited

U.S. PATENT DOCUMENTS

| 4,195,874 A * | 4/1980 | Janssen et al. ............. 296/180.1 |
| 4,886,312 A * | 12/1989 | Asoh ............................... 296/76 |
| 7,652,825 B2 * | 1/2010 | Nakamura et al. ............ 359/630 |
| 2008/0258504 A1 * | 10/2008 | Sakane et al. ............ 296/193.08 |

FOREIGN PATENT DOCUMENTS

| JP | 2004-130916 | 4/2004 |
| JP | 2008-155843 | 7/2008 |

* cited by examiner

*Primary Examiner* — Dennis Pedder
*Assistant Examiner* — Beverly Becker
(74) *Attorney, Agent, or Firm* — Ditthavong Mori & Steiner, P.C.

(57) ABSTRACT

A vehicle rear windshield structure includes a first rear windshield, a second rear windshield, and a light shielding wall. The first rear windshield is to secure rearward visibility from an inside of a vehicle body. The second rear windshield is provided below the first rear windshield to secure rearward visibility from the inside of the vehicle body. The light shielding wall is provided between the first rear windshield and the second rear windshield to reduce light coming from an outside of the vehicle body through the second rear windshield to the first rear windshield.

18 Claims, 13 Drawing Sheets

VEHICLE REAR WINDSHIELD STRUCTURE

CROSS-REFERENCE TO RELATED APPLICATIONS

The present application claims priority under 35 U.S.C. §119 to Japanese Patent Application No. 2010-268540, filed Dec. 1, 2010, entitled "Vehicle Rear Windshield Structure". The contents of this application are incorporated herein by reference in their entirety.

BACKGROUND OF THE INVENTION

1. Field of the Invention

The present invention relates to a vehicle rear windshield structure.

2. Discussion of the Background

As an example of related techniques on a vehicle rear windshield structure, provided is a structure in which a polarization plate is arranged on a surface of a reflective member disposed on an instrument panel so that an image of the reflective member reflected in the vehicle windshield, which is caused by light coming from outside through the windshield, may become inconspicuous when seen from a driver's position.

Such a vehicle windshield structure described above allows the use of reflective member that otherwise cannot be disposed on the instrument panel (see, for example, Japanese Unexamined Patent Application Publication No. 2004-130916).

As another example of such a rear windshield structure, provided is a structure that has a first slanted rear windshield installed at a rear section of a roof and a second rear windshield installed at an end portion of a trunk lid. A driver can observe an area behind the vehicle through the second rear windshield and a window provided in an interior wall of a luggage compartment, which is equipped under the first windshield at a rear end of the vehicle body.

Such a vehicle rear windshield structure allows a driver to observe wider area behind the vehicle (see, for example, Japanese Unexamined Patent Application Publication No. 2008-155843).

SUMMARY OF THE INVENTION

According to one aspect of the present invention, a vehicle rear windshield structure comprises a first rear windshield, a second rear windshield, and a light shielding wall. The first rear windshield is to secure rearward visibility from an inside of a vehicle body. The second rear windshield is provided below the first rear windshield to secure rearward visibility from the inside of the vehicle body. The light shielding wall is provided between the first rear windshield and the second rear windshield to reduce light coming from an outside of the vehicle body through the second rear windshield to the first rear windshield.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings. Any of the drawings will be viewed in the direction in which the reference numerals and symbols are viewed.

Figure 1:
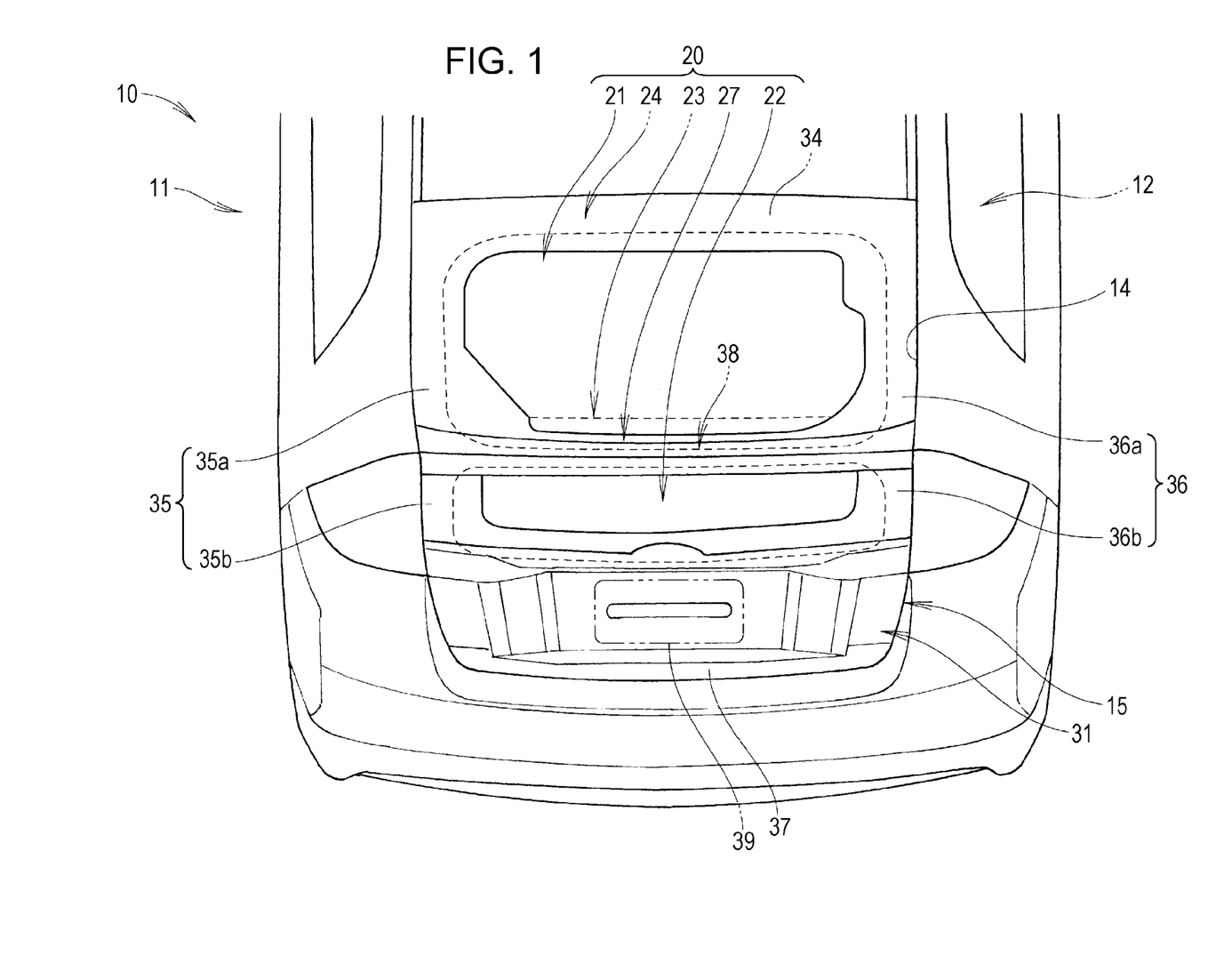
FIG. 1 is a plan view of a vehicle rear section that employs a vehicle rear windshield structure according to an embodiment of the present invention.
Figure 2:
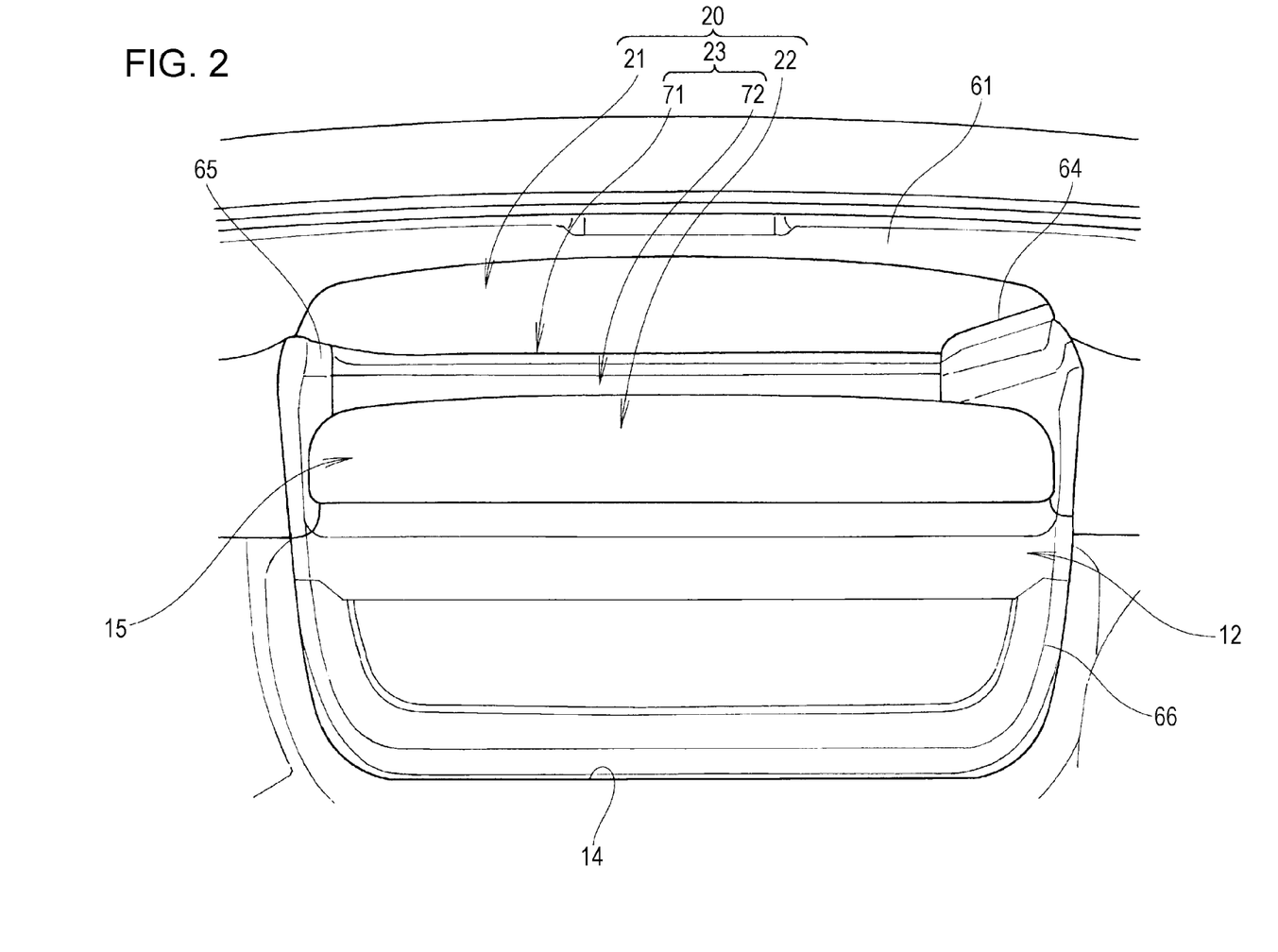
FIG. 2 is a plan view of a tailgate, as seen from a vehicle interior, which employs the vehicle rear windshield structure according to an embodiment of the present invention.
Figure 3:
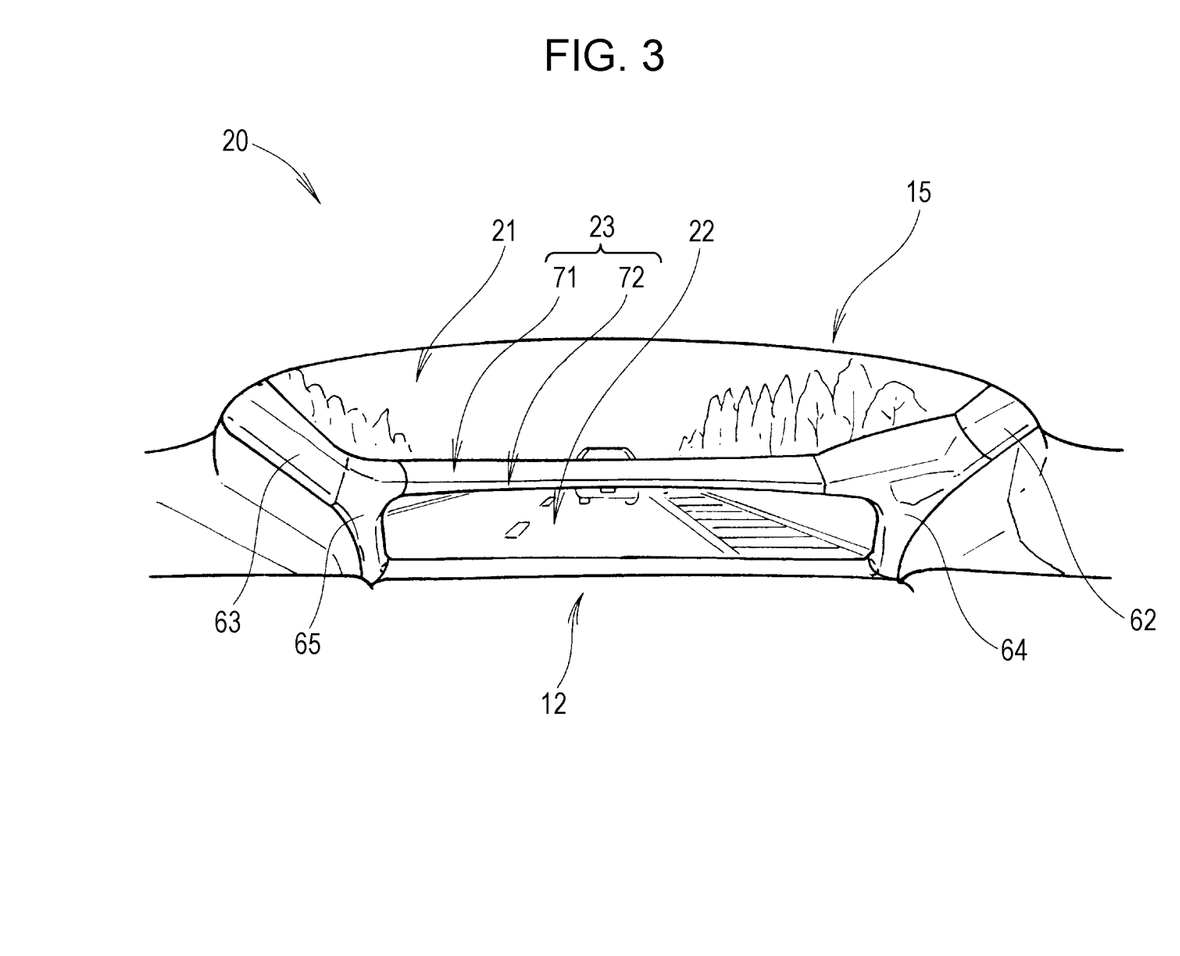
FIG. 3 is a perspective view of the tailgate, as seen from the vehicle interior, which employs the vehicle rear windshield structure according to an embodiment of the present invention.
Figure 4:
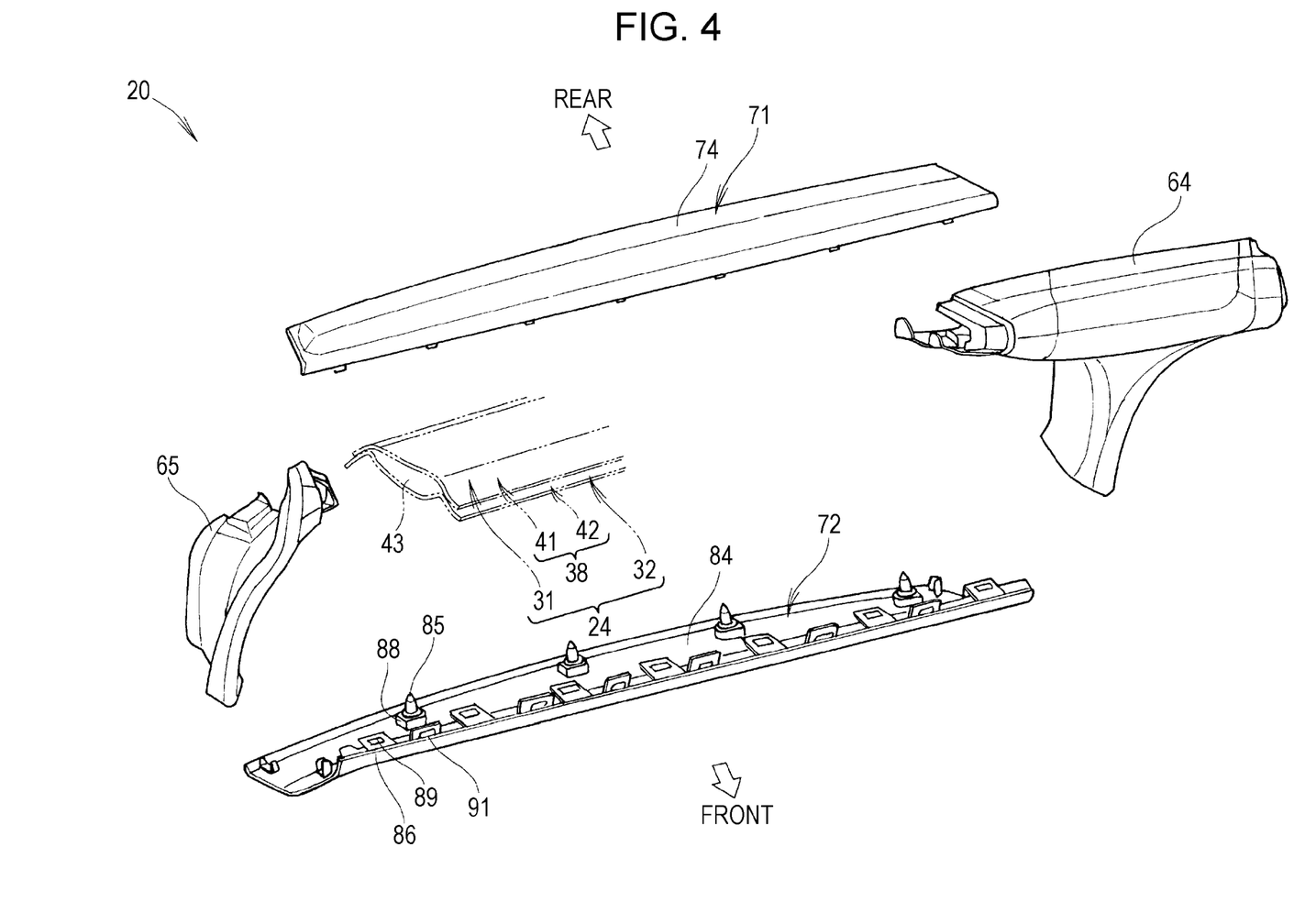
FIG. 4 is an exploded perspective view of the vehicle rear windshield structure according to an embodiment of the present invention.
Figure 5:
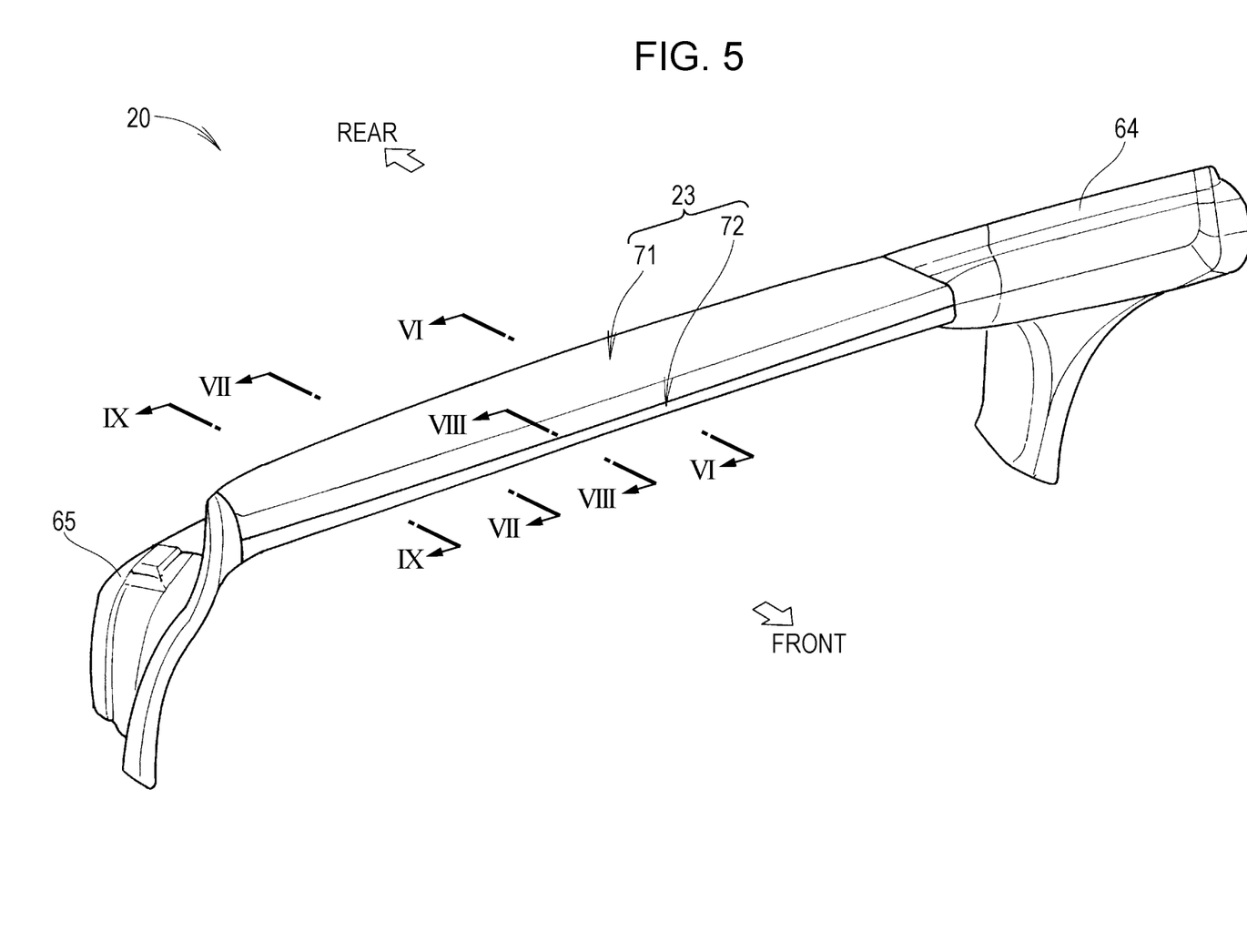
FIG. 5 is a perspective view of the vehicle rear windshield structure according to an embodiment of the present invention.

As shown in FIGS. 1 to 3, a vehicle 10 has an opening 14 provided in the rear section of a vehicle body 11 and a tailgate 15 that openably covers the opening 14.

The tailgate 15 includes; a first rear windshield 21 that allows a driver in a vehicle body 11 to see behind the vehicle; a second rear windshield (it is also referred to as an extra windshield) 22 that is provided below the first rear windshield 21 and gives an another rear view to the driver; a light shielding wall 23 that is provided in a vehicle interior 12 and between the first rear windshield 21 and the second rear windshield 22, and reduces light coming from a road surface through the second rear windshield, which is otherwise reflected by the first rear windshield 21; a frame (it is tailgate main body) 24 that supports the first rear windshield 21, the second rear windshield 22, and the light shielding wall 23; and an exterior garnish 27 that fits to a gap 26 between the first rear windshield 21 and the second rear windshield 22 so as to cover the gap 26 from the outside of the vehicle.

A vehicle rear windshield structure 20 includes the first rear windshield 21, the second rear windshield 22, the light shielding wall 23, the exterior garnish 27, and the frame 24.

The frame 24 includes an outer panel 31 and an inner panel 32. The outer panel 31 is disposed over the inner panel 32 (see FIG. 6) provided at the side of the vehicle interior 12. In addition, the frame 24 includes an upper frame 34 that is mounted in the opening 14 with a hinge (not illustrated) through the outer panel 31 and the inner panel 32, right and left side frames 35, 36 extending from both ends of the upper frame 34, a lower frame 37 that is connected to the right and left side frames 35, 36 and on which a license plate 39 is mounted, and an intermediate frame 38 connecting center portions of the right and left side frames 35, 36.

As shown in FIGS. 4 to 11, the intermediate frame 38 has an outer frame portion 41, an inner frame portion 42, the outer panel 31, and the inner panel 32. The outer frame portion 41 is placed at the side of the outer panel 31, and the inner frame portion 42 is placed at the side of the inner panel 32. The various shapes of cross section 43 are illustrated in the drawings.

The outer frame portion 41 has a first sealing portion 45 that tightly contacts with the first rear windshield 21, a second sealing portion 46 that tightly contacts with the second rear windshield 22, an outer clip hole 47 for mounting the exterior garnish 27, a hooking hole 48 to which an upper garnish 71 is hooked, and a contact portion 49 with which the upper garnish is brought into contact.

The inner frame portion 42 has an upper clip hole 51 for mounting the upper garnish 71 and a lower clip hole 52 for mounting a lower garnish 72.

A dam rubber 54 and an adhesive 55 are provided in a gap between the first rear windshield 21 and the first sealing portion 45 for the purpose of sealing the gap to prevent ingress of rain water. Also, a dam rubber 56 and an adhesive 57 are provided at a gap between the second rear windshield 22 and the second sealing portion 46.

As shown in FIGS. 1 to 3, the upper frame 34 is concealed by a roof lining 61 provided in the upper part of the vehicle interior 12 when the tailgate 15 is closed. Upper portions 35a, 36a of the right and left side frames 35, 36 are covered with right and left side linings 62, 63, respectively, from the vehicle interior 12. Lower portions 35b, 36b of the right and left side frames 35, 36 are covered with right and left side stay members 64, 65, respectively, from the vehicle interior 12. The right and left side stay members 64, 65 are constituent members of the light shielding wall 23. The lower frame 37 is covered with a tailgate lining 66 from the vehicle interior 12.

As shown in FIGS. 6 to 10, the exterior garnish 27 is provided with an outer clip 68 that fits into the outer clip hole 47 of the outer frame portion 41.

The light shielding wall 23 includes the upper garnish 71 disposed in the upper portion, the lower garnish 72 disposed in the lower portion, and the right and left side stay members 64, 65 that support the upper garnish 71 and the lower garnish 72 and cover the lower portions 35b, 36b of the right and left side frames 35, 36 (see FIG. 1), respectively, from the vehicle interior 12. The right and left side stay members 64, 65 are supported by the lower portions 35b, 36b of the right and left side frames 35, 36.

The upper garnish 71 and the lower garnish 72 also serve as an inner garnish that covers the gap 26 between the first rear windshield 21 and the second rear windshield 22 from the vehicle interior 12. The upper garnish 71 and the lower garnish 72 is also directly supported by the intermediate frame 38, as described later.

The upper garnish 71 has an upper garnish main body 74 extending breadthways, a frame upper clip 75 to be locked in the frame 24 (the upper clip hole 51 of the inner frame portion 42), a hook 76 with which the rear end portion of the upper garnish 71 is secured to the frame 24, a rib 77 that is brought into contact with the frame 24 (contact portion 49 of the outer frame portion 41) so as to set the height position of the rear end portion of the upper garnish 71, a connecting clip 78 that is connected to the lower garnish 72, a locating pawl 79 that is provided in the upper garnish 71 and longitudinally locates the lower garnish 72, and a front-end projection 71b that locks a front end 71a in the lower garnish 72. The frame upper clip 75, the hook 76, the rib 77, the connecting clip 78, the locating pawl 79, and the front-end projection 71b are provided in plurality along the breadthways direction.

The frame upper clip 75 is supported by an upper clip seat 81 formed in the upper garnish 71. The connecting clip 78 is supported by a clip support 82 formed in the upper garnish 71. The clip support 82 has a locking hole 83 in which the connecting clip 78 is locked.

The lower garnish 72 includes a lower main body 84 extending breadthways, a frame lower clip 85 that is locked in the frame 24 (the lower clip hole 52 of the inner frame portion 42), a bracket (mating portion) 86 with which the connecting clip 78 of the upper garnish 71 is mated, a step 87 that receives the front end 71a of the upper garnish 71, and a lower locking hole 91 in which the front-end projection 71b of the upper garnish 71 is locked. The frame lower clip 85, the bracket (mating portion) 86, and the lower locking hole 91 are provided in plurality along the breadthways direction.

The frame lower clip 85 is mated with a lower clip seat 88 formed in the lower garnish 72. The lower clip seat 88 has a lower supporting hole 92 formed therein. The bracket 86 has a square hole 89 formed therein.

Figure 6:
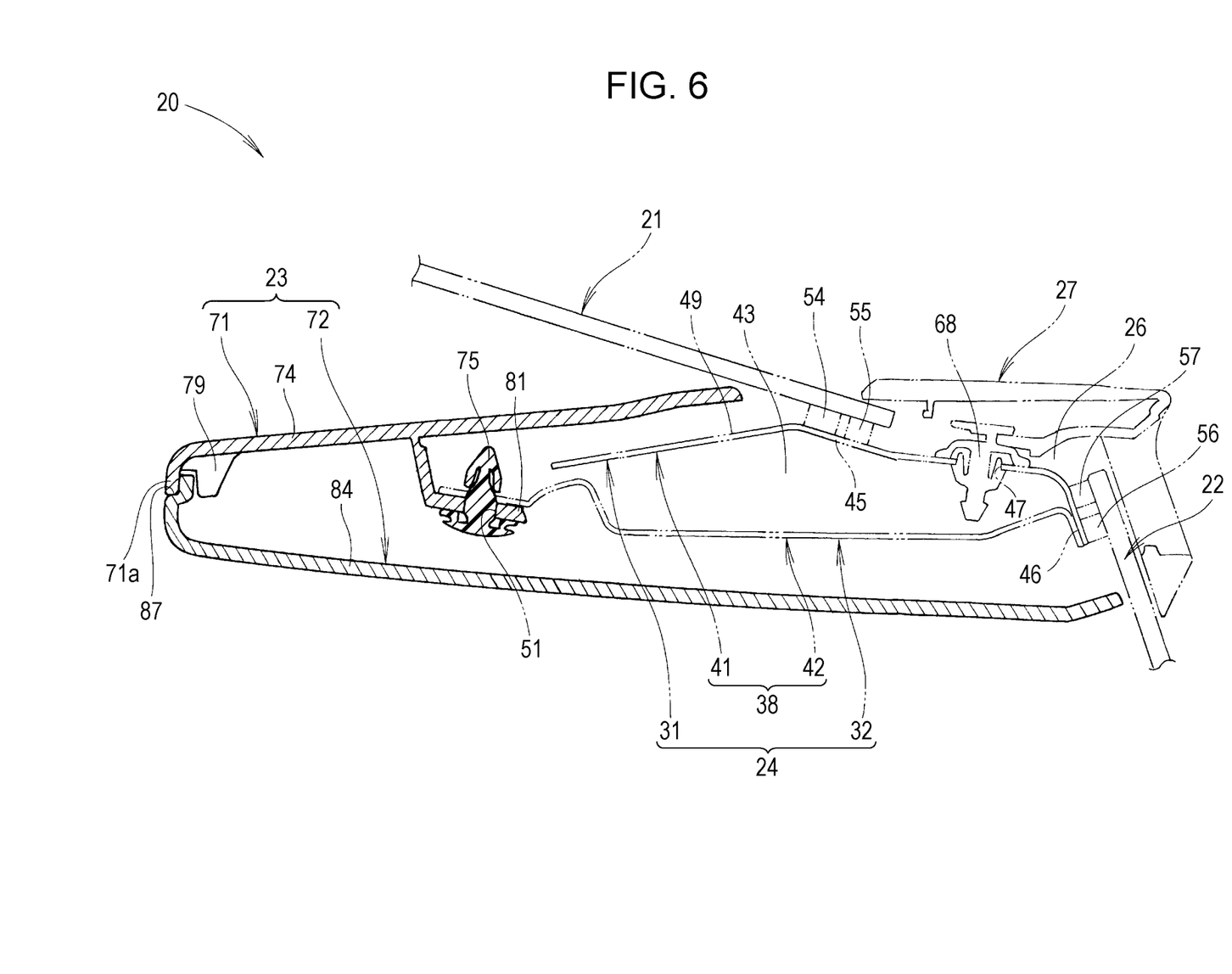
FIG. 6 is a view of section taken along line VI-VI in FIG. 5.

As shown in FIG. 6, the vehicle rear windshield structure 20 includes the first rear windshield 21 that allows a driver to see behind the vehicle body 11 (see FIG. 1) and the second rear windshield 22 that is provided below the first rear windshield 21 and gives an another rear view to the driver.

In the vehicle rear windshield structure 20, the light shielding wall 23 that reduces reflected light from a road surface through the second rear windshield 22 behind the vehicle body which is otherwise reflected on the first rear windshield 21 is provided between the first rear windshield 21 and the second rear windshield 22, thereby preventing reflected light from being reflected on the first rear windshield 21 through the second rear windshield 22. This arrangement allows a driver to see behind the vehicle better through both the first rear windshield 21 and the second rear windshield 22.

As shown in FIGS. 1 and 6, the vehicle rear windshield structure 20 has the opening 14 provided in the rear section of the vehicle body 11 and the tailgate 15 that openably covers the opening 14. The tailgate 15 is generally a plate-like component and may have not sufficient strength or rigidity. While the first rear windshield 21, the second rear windshield 22, and the light shielding wall 23 are provided in the tailgate 15, the light shielding wall 23, for example, can play a role as a reinforcement member, thereby enhancing the strength and rigidity of the tailgate 15.

As shown in FIG. 6, the vehicle rear windshield structure 20 has the first rear windshield 21 provided in the vehicle body 11 (see FIG. 1) so as to be slanted downward and extend rearward and has the second rear windshield 22 provided substantially vertically in the vehicle body 11. In other words, the first and second rear windshields 21, 22 are mounted at different angles in the vehicle body 11, which prevents a situation in which incoming sun beam or directional light beam such as headlight blocks driver's rearward vision through both of the first and second rear windshields.

In the vehicle rear windshield structure 20, the light shielding wall 23 projects substantially horizontally toward the vehicle interior 12, which does not block driver's rearward vision, thereby allowing the driver to see behind the vehicle better.

In the vehicle rear windshield structure 20, the light shielding wall 23 is constructed of the upper garnish 71 that covers the frame 24 of the tailgate 15 (see FIG. 1) from above in the vehicle interior 12 and the lower garnish 72 that covers the frame 24 of the tailgate 15 from below in the vehicle interior 12 in a separable manner. Accordingly, the frame 24 of the tailgate 15 can be covered with the upper garnish 71 and the lower garnish 72 from above and below, thereby enhancing the design flexibility of the vehicle interior 12.

Figure 7:
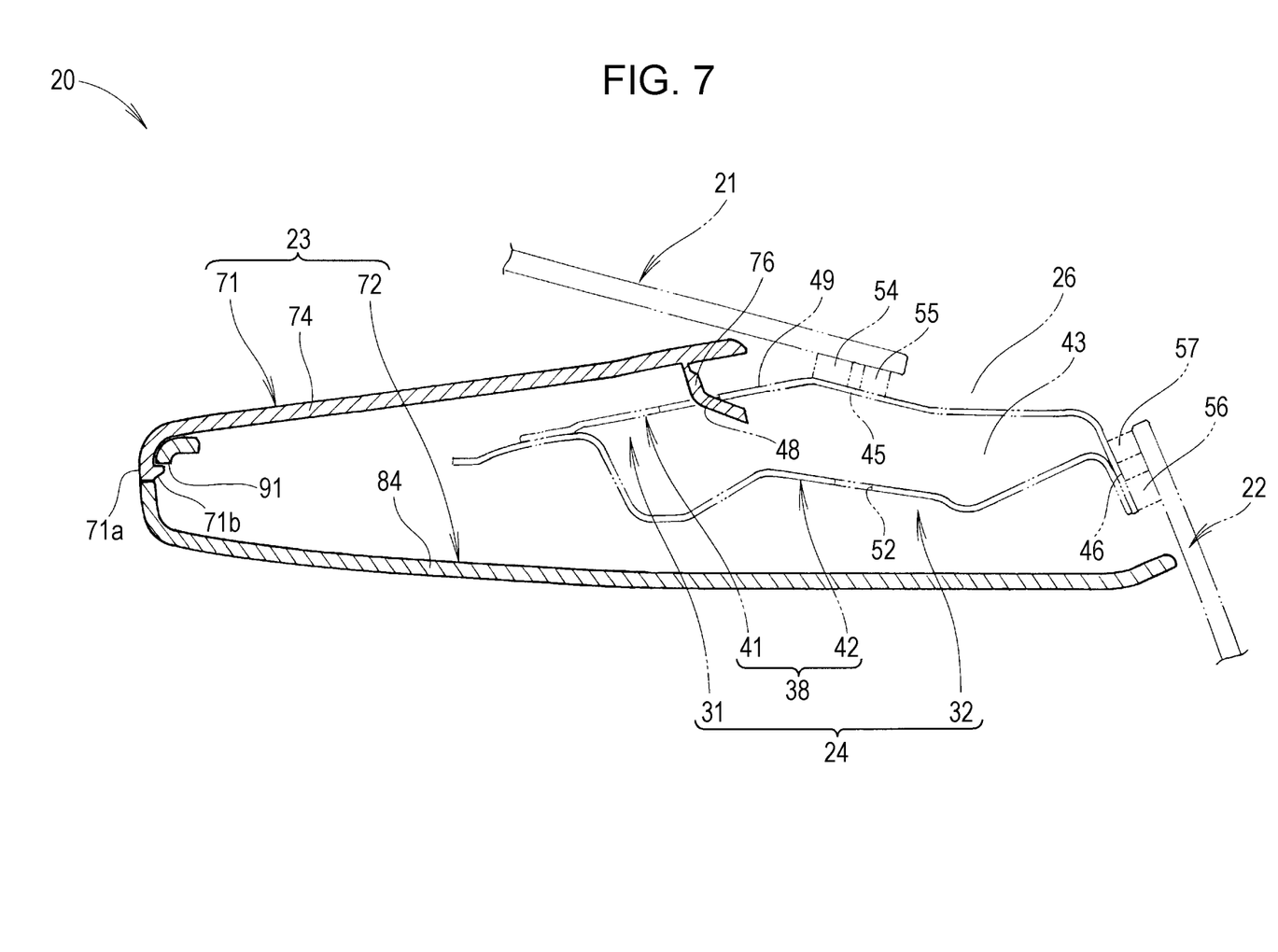
FIG. 7 is a view of section taken along line VII-VII in FIG. 5.
Figure 9:
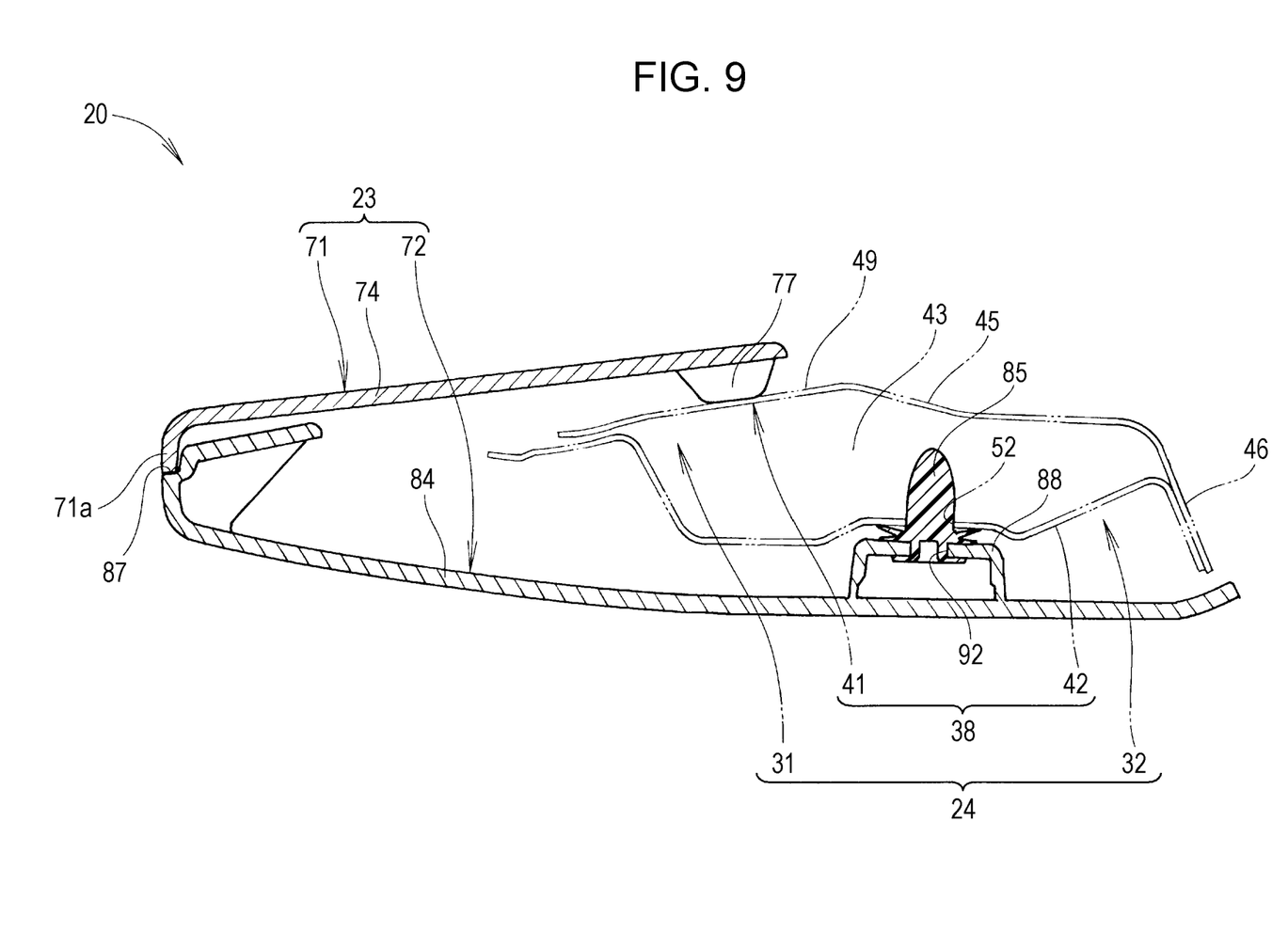
FIG. 9 is a view of section taken along line IX-IX in FIG. 5.
Figure 10:
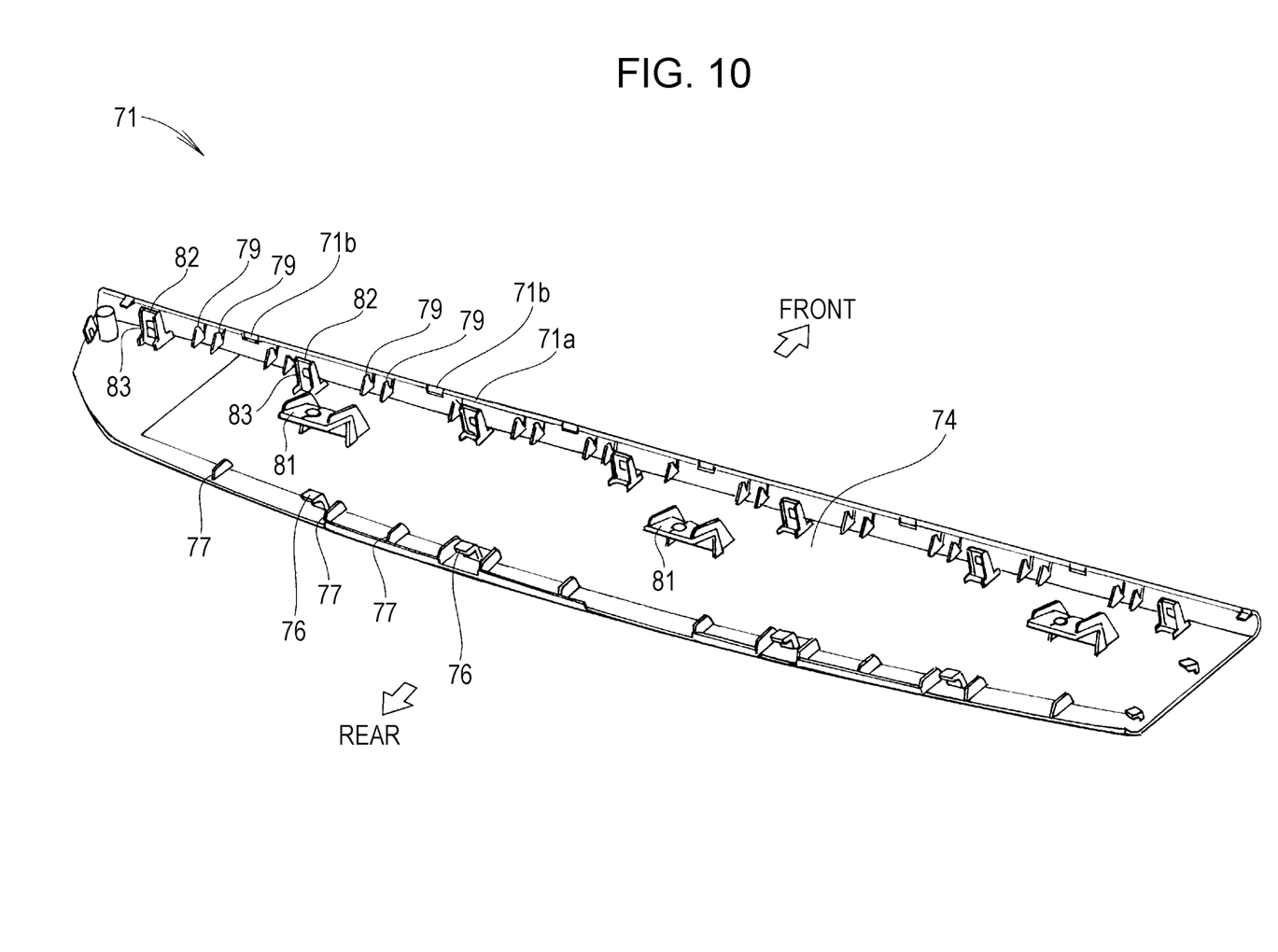
FIG. 10 is a perspective view of an upper garnish, as seen from the back side thereof, of the vehicle rear windshield structure according to an embodiment of the present invention.
Figure 11:
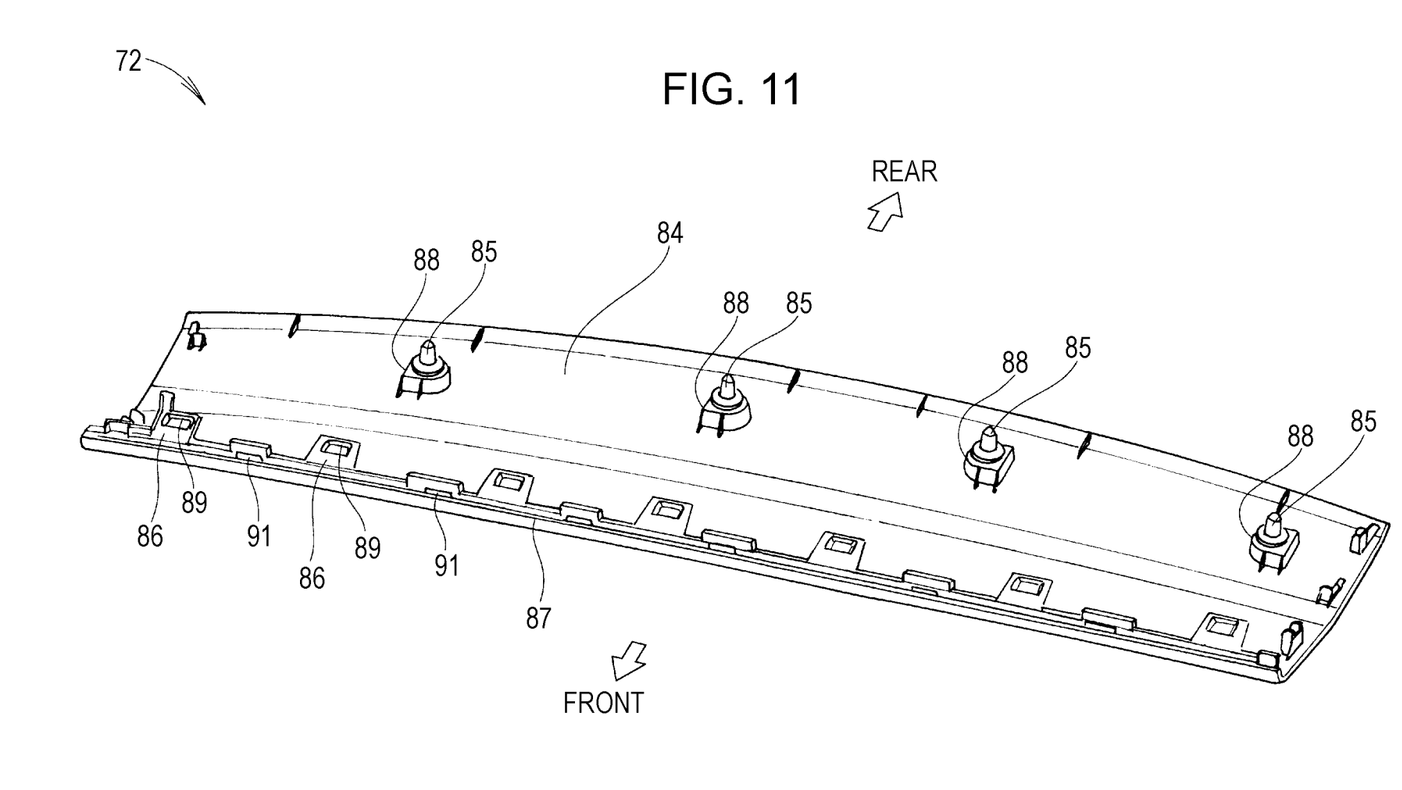
FIG. 11 is a perspective view of a lower garnish, as seen from the back side thereof, of the vehicle rear windshield structure according to an embodiment of the present invention.

As shown in FIGS. 6, 7, and 9, the upper garnish 71 in the vehicle rear windshield structure 20 is provided with the frame upper clip 75 to be locked in the frame 24, the hook 76 with which the rear end portion of the upper garnish 71 is secured to the frame 24, the rib 77 that is brought into contact with the frame 24 so as to set the height position of the rear end portion thereof, which makes it easier to mount the upper garnish 71 in the frame 24 and the lower garnish 72. This arrangement enhances ease of assembly of the upper garnish 71. In addition, this arrangement improves the finish of the vehicle rear windshield structure 20.

Figure 8:
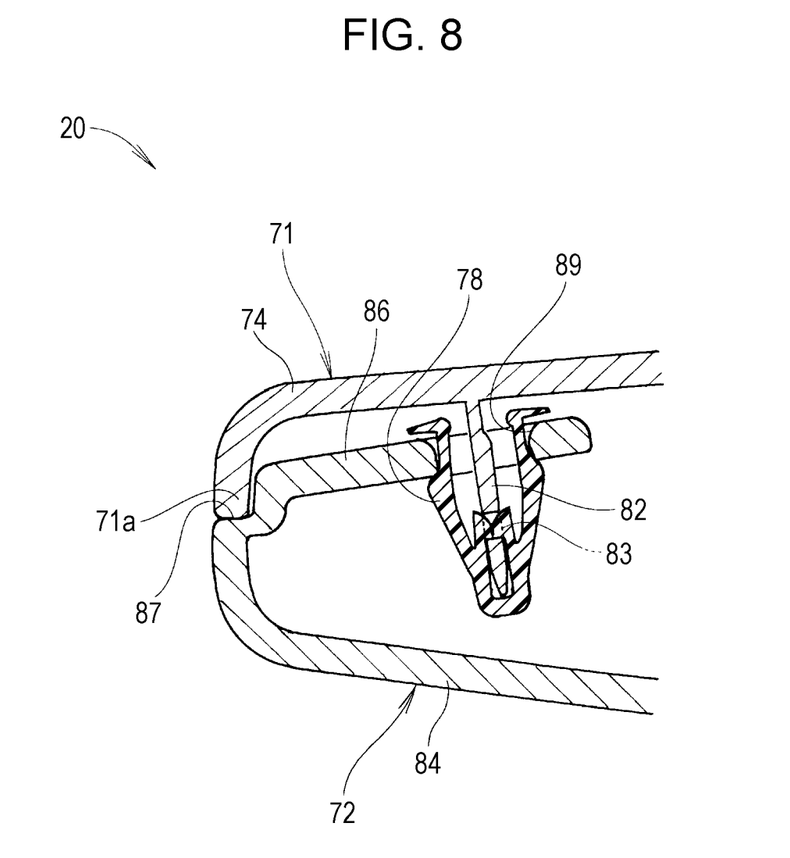
FIG. 8 is a view of section taken along line VIII-VIII in FIG. 5.

As shown in FIGS. 6, 7, and 8, the upper garnish 71 in the vehicle rear windshield structure 20 is also provided with the connecting clip 78 that connects the upper garnish 71 to the lower garnish 72 and the locating pawl 79 that longitudinally locates the lower garnish 72, thereby allowing the upper garnish 71 and the lower garnish 72 to be integrally connected to each other with accuracy.

As shown in FIGS. 8 and 9, the lower garnish 72 in the vehicle rear windshield structure 20 is provided with the frame lower clip 85 that is locked in the frame 24 and the bracket (mating portion) 86 with which the connecting clip 78 is mated, which makes it easier to mount the lower garnish 72 in the frame 24, thereby enhancing ease of assembly of the lower garnish 72.

As shown in FIGS. 6 and 9, the vehicle rear windshield structure 20 has the frame upper clip 75 provided in the upper garnish 71 and the frame lower clip 85 provided in the lower garnish 72, thereby allowing the upper garnish 71 and the lower garnish 72 to be mounted directly in the intermediate frame 38. This arrangement enhances the support stiffness of the upper garnish 71 and the lower garnish 72.

As shown in FIG. 7, the upper garnish 71 in the vehicle rear windshield structure 20 is provided with the front-end projection 71b that locks the front end 71a in the lower garnish 72, while the lower garnish 72 is provided with the lower locking hole 91 in which the front-end projection 71b of the upper garnish 71 is locked, thereby allowing the upper garnish 71 and the lower garnish 72 to be more stiffly connected to each other.

Figure 12A:
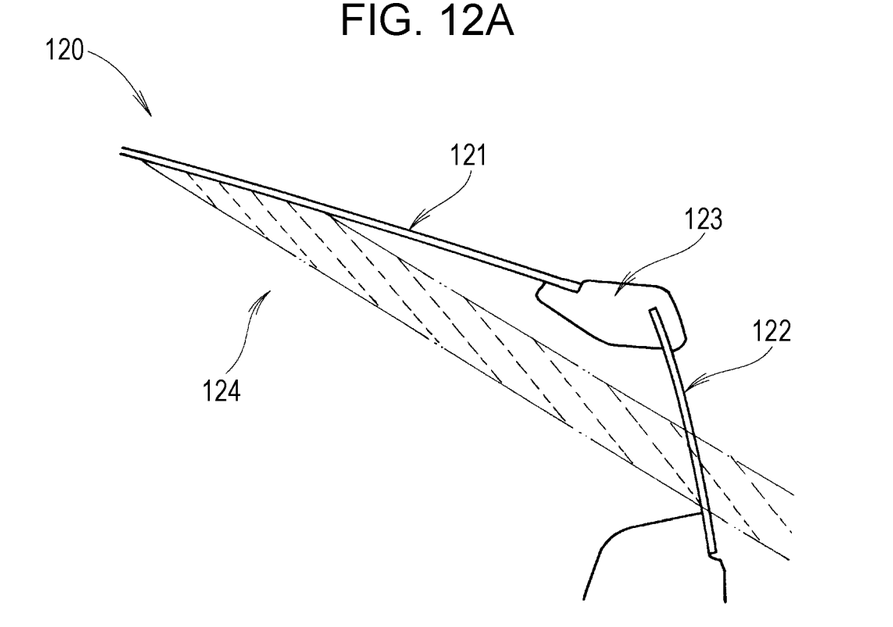
FIG. 12A is a comparison diagram of a side cross-section of the vehicle rear windshield structure.

As shown in FIG. 12A, a vehicle rear windshield structure 120 shown in Comparative Example includes a first rear windshield 121, a second rear windshield (extra windshield) 122, a garnish 123 intervened between the first rear windshield 121 and the second rear windshield 122, and a frame (not illustrated) that supports the first rear windshield 121, the second rear windshield 122, and the garnish 123. The garnish 123 does not project toward the vehicle interior 124.

Figure 13A:
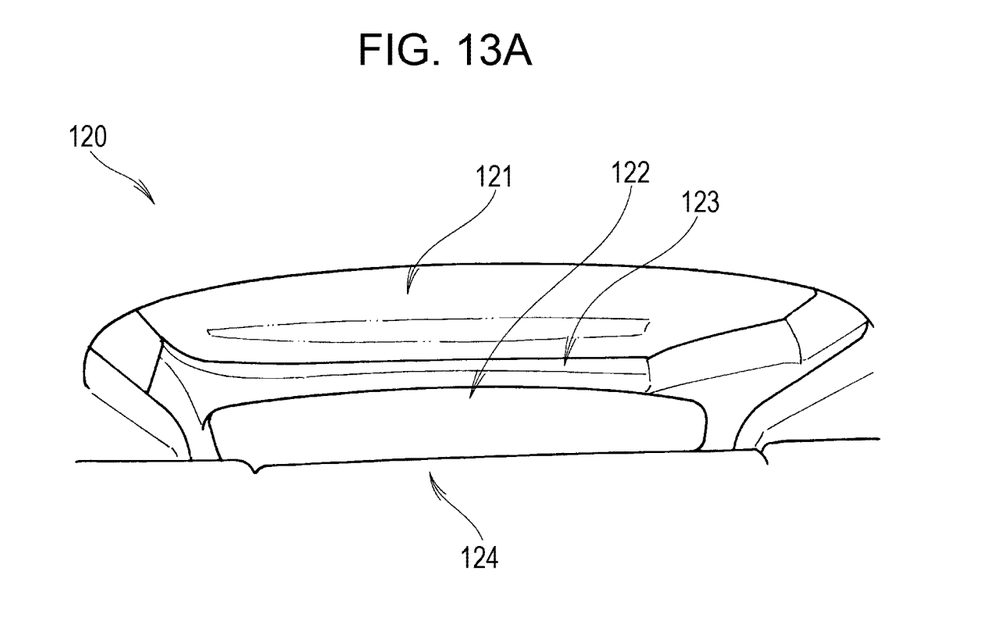
FIG. 13A is a comparison diagram illustrating a view seen from inside a vehicle with a rear windshield structure.

Accordingly, as shown in FIG. 13A, incoming light from a road surface behind the vehicle body through the second rear windshield 122 is reflected on the first rear windshield 121, which may block the driver's rearward vision through the first rear windshield 121 or the second rear windshield 122.

Figure 12B:
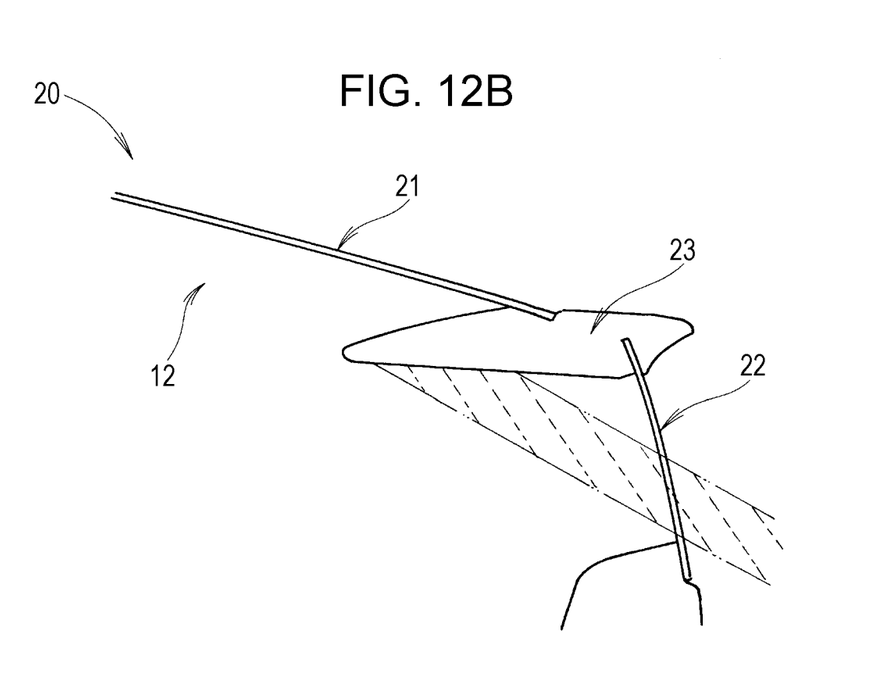
FIG. 12B is a diagram of the structure according to an embodiment of the present invention.

As shown in FIG. 12B, in the vehicle rear windshield structure 20, the light shielding wall 23 is provided between the first rear windshield 21 and the second rear windshield 22. This arrangement reduces incoming light from a road surface behind the vehicle body through the second rear windshield 22, which is otherwise reflected on the first rear windshield 21.

Figure 13B:
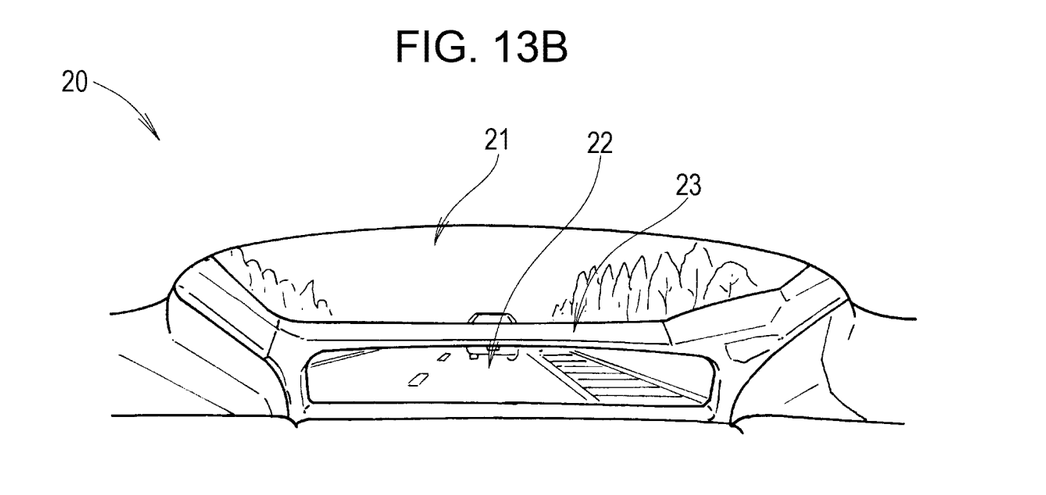
FIG. 13B is a diagram illustrating the view according to an embodiment of the present invention.

Accordingly, as shown in FIG. 13B, light coming through the second rear windshield 22, which is to be reflected on the first rear windshield 21, may be reduced by the light shielding wall 23. This arrangement allows the driver to see behind the vehicle better through the first rear windshield 21 and the second rear windshield 22.

In the vehicle rear windshield structure according to the embodiment of the present invention, the light shielding wall 23 projects toward the vehicle interior 12, as shown in FIG. 6, but is not limited to this. The light shielding wall 23 may be extended along a line connecting driver's eye position and the light shielding wall 23, thereby allowing the driver to see behind the vehicle much better.

The vehicle rear windshield structure according to the embodiment of the present invention may be applied to sedans or station wagons which have a first rear windshield that allows a driver to see behind the vehicle and a second rear windshield that is provided below the first rear windshield and gives an another rear view to the driver.

An embodiment of the present invention provides a vehicle rear windshield structure that includes a first rear windshield that allows a driver to see behind a vehicle body, a second rear windshield that is provided below the first rear windshield and gives the driver an another rear view, and a light shielding wall that is provided between the first rear windshield and the second rear windshield to reduce light coming from a road surface behind the vehicle body through the second rear windshield. The incoming light through the second rear windshield may be reflected by the first rear windshield if the light shielding wall is not provided. This arrangement prevents incoming light through the second rear windshield 22 from being reflected on the first rear windshield 21, thereby allowing a driver to see behind the vehicle better through both the first rear windshield 21 and the second rear windshield 22.

An embodiment of the present invention provides a vehicle rear windshield structure, wherein the vehicle body may have an opening provided in the rear section of the body; and a tailgate that openably covers the opening and has the first rear windshield, the second rear windshield, and the light shielding wall provided between the first and second rear windshields. The tailgate is generally a plate-like component and may have not sufficient strength or rigidity. While the first rear windshield, the second rear windshield, and the light shielding wall are provided in the tailgate, the light shielding wall, for example, can play a role as a reinforcement member, thereby enhancing the strength and rigidity of the tailgate.

An embodiment the present invention provides a vehicle rear windshield structure, wherein the first rear windshield may be provided in the vehicle body so as to be slanted downward and extend rearward and the second rear windshield may be provided substantially vertically in the vehicle body. In other words, the first and second rear windshields are mounted at different angles in the vehicle body, which prevents a situation in which incoming sun beam or directional light beam such as headlight simultaneously blocks driver's rearward vision through the first and second rear windshields.

An embodiment of the present invention provides a vehicle rear windshield structure, wherein the light shielding wall may project substantially horizontally toward a vehicle interior. This arrangement does not block driver's rearward vision, thereby allowing the driver to see behind the vehicle better.

An embodiment of the present invention provides a vehicle rear windshield structure, wherein the light shielding wall may be constructed in a separable manner of an upper garnish that covers a frame of the tailgate from above in the vehicle interior and a lower garnish that covers the frame of the tailgate from below in the vehicle interior. This arrangement allows the frame of the tailgate to be covered with the upper garnish and the lower garnish from above and below, thereby enhancing the design flexibility on the vehicle interior.

An embodiment of the present invention provides a vehicle rear windshield structure, wherein the upper garnish may be provided with a frame upper clip to be locked in the frame, a hook with which a rear end portion of the upper garnish is secured to the frame, a rib that is brought into contact with the frame so as to set the height position of the upper garnish, a connecting clip that is connected to the lower garnish, and a locating pawl that longitudinally locates the lower garnish. This arrangement makes it easier to mount the upper garnish in the frame and the lower garnish, thereby enhancing ease of assembly of the upper garnish. Also, this arrangement improves the finish of the vehicle rear windshield structure.

Furthermore, this arrangement allows the upper garnish and the lower garnish to be integrally connected to each other with accuracy.

An embodiment of the present invention provides a vehicle rear windshield structure, wherein the lower garnish may be provided with a frame lower clip to be locked in the frame and a bracket with which the connecting clip is mated. This arrangement makes it easier to mount the lower garnish in the frame, thereby enhancing ease of assembly of the lower garnish.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle rear windshield structure comprising:
   a first rear windshield to secure rearward visibility from an inside of a vehicle body;
   a second rear windshield provided below the first rear windshield to secure rearward visibility from the inside of the vehicle body, a minimum distance between the first rear windshield and the second rear windshield being shorter than a maximum length of the second rear windshield in a vertical cross-section extending from a front of the vehicle body to a rear of the vehicle body; and
   a light shielding wall provided between the first rear windshield and the second rear windshield to reduce light coming from an outside of the vehicle body through the second rear windshield to the first rear windshield.

2. A vehicle rear windshield structure comprising;
   a first rear windshield to secure rearward visibility from an inside of a vehicle body;
   a second rear windshield provided below the first rear windshield to secure rearward visibility from the inside of the vehicle body; and
   a light shielding wall provided between the first rear windshield and the second rear windshield to reduce light coming from an outside of the vehicle body through the second rear windshield to the first rear windshield, wherein
   the vehicle body has an opening disposed in a rear section of the vehicle body and a tailgate openably covering the opening, and
   the first rear windshield, the second rear windshield, and the light shielding wall are provided in the tailgate.

3. The vehicle rear windshield structure according to claim 1, wherein
   the first rear windshield is provided in the vehicle body and extends rearward to be slanted downward, and
   the second rear windshield is provided substantially vertically in the vehicle body.

4. The vehicle rear windshield structure according to claim 1, wherein
   the light shielding wall projects substantially horizontally toward the inside of the vehicle body from the first rear windshield.

5. The vehicle rear windshield structure according to claim 2, wherein
   the light shielding wall includes an upper garnish disposed inside the vehicle body and covering an intermediate frame of the tailgate from above the intermediate frame, and a lower garnish disposed inside the vehicle body and covering the intermediate frame of the tailgate from below the intermediate frame.

6. The vehicle rear windshield structure according to claim 5, wherein
   the upper garnish includes a upper clip fixed to be the intermediate frame, a hook disposed at a rear end portion of the upper garnish and hooked to the intermediate frame, a rib disposed in contact with the intermediate frame to set a height position of the upper garnish with respect to the tailgate, a connecting clip connected to the lower garnish, and a locating pawl to position the lower garnish with respect to the upper garnish along a longitudinal direction of the vehicle body.

7. The vehicle rear windshield structure according to claim 6, wherein
   the lower garnish includes a lower clip fixed to the intermediate frame and a bracket to which the connecting clip is connected.

8. The vehicle rear windshield structure according to claim 5, wherein
   the intermediate frame of the tailgate is disposed between the first and second rear windshields.

9. The vehicle rear windshield structure according to claim 1, wherein
   the light shielding wall projects substantially horizontally toward an inside of the vehicle body from the first rear windshield, and
   a space is provided between the first rear windshield and an upper surface of the light shielding wall.

10. The vehicle rear windshield structure according to claim 1, wherein
    the light shielding wall is to reduce light coming from a road surface behind the vehicle body through the second rear windshield to the first rear windshield.

11. The vehicle rear windshield structure according to claim 1, further comprising:
    a frame provided in the vehicle body and comprising:
       an upper frame including a first end and a second end;
       a lower frame including a first end and a second end;
       a first side frame connecting the first end of the upper frame to the first end of the lower frame;
       a second side frame connecting the second end of the upper frame to the second end of the lower frame; and
       an intermediate frame connecting the first side frame to the second side frame and provided between the first rear windshield and the second rear windshield, wherein a first opening is defined by the upper frame, the first side frame, the second side frame, and the intermediate frame, wherein a second opening is defined by the lower frame, the first side frame, the second side frame, and the intermediate frame, wherein the first rear windshield is provided in the first opening, and wherein the second rear windshield is provided in the second opening.

12. The vehicle rear windshield structure according to claim 11, wherein the light shielding wall is connected to the intermediate frame.

13. The vehicle rear windshield structure according to claim 11, wherein the light shielding wall includes an upper garnish disposed inside the vehicle body and covering the intermediate frame from above the intermediate frame, and a lower garnish disposed inside the vehicle body and covering the intermediate frame from below the intermediate frame.

14. The vehicle rear windshield structure according to claim 13, wherein the upper garnish includes a upper clip fixed to be the intermediate frame, a hook disposed at a rear end portion of the upper garnish and hooked to the intermediate frame, a rib disposed in contact with the intermediate frame to set a height position of the upper garnish with respect to the tailgate, a connecting clip connected to the lower garnish, and a locating pawl to position the lower garnish with respect to the upper garnish along a longitudinal direction of the vehicle body.

15. The vehicle rear windshield structure according to claim 14, wherein the lower garnish includes a lower clip fixed to the intermediate frame and a bracket to which the connecting clip is connected.

16. The vehicle rear windshield structure according to claim 11, further comprising:

a first sealing member provided between the first rear windshield and the intermediate frame; and a second sealing member provided between the second rear windshield and the intermediate frame.

17. The vehicle rear windshield structure according to claim 11, further comprising:

an exterior garnish provided outside the first rear windshield and the second rear windshield to cover a gap between the first rear windshield and the second rear windshield, the exterior garnish being connected to the intermediate frame.

18. The vehicle rear windshield structure according to claim 1, wherein the light shielding wall covers a gap between the first rear windshield and the second rear windshield from the inside of the vehicle body.

* * * * *